Figure 1:
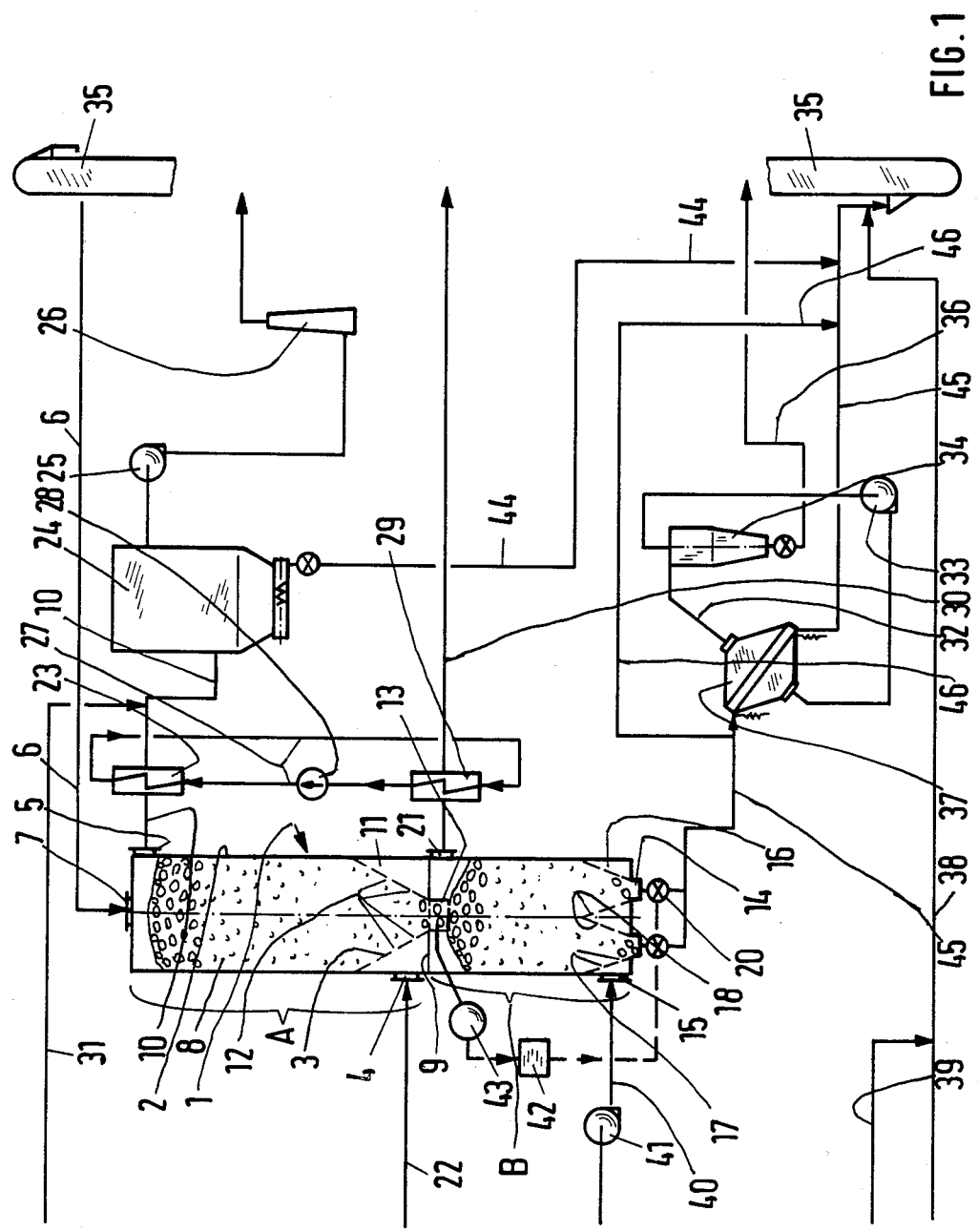

United States Patent [19]

Curtius

[11] Patent Number: 4,780,290

[45] Date of Patent: Oct. 25, 1988

[54] METHOD FOR PURIFYING FLUE GAS

[76] Inventor: Friedrich R. Curtius, Schachenstr. 72, D-8990 Lindau/Bodensee, Fed. Rep. of Germany

[21] Appl. No.: 870,718

[22] Filed: Jun. 4, 1986

[30] Foreign Application Priority Data

Jun. 18, 1985 [CH] Switzerland ............... 2579/85

[51] Int. Cl.$^4$ .................. B01J 8/00; C01B 21/00; C01B 17/00
[52] U.S. Cl. ............................ 423/244; 423/239
[58] Field of Search ........... 423/244 R, 244 A, 239, 423/239 A

[56] References Cited

U.S. PATENT DOCUMENTS

| | | | |
|---|---|---|---|
| 2,551,905 | 5/1951 | Robinson | 423/244 |
| 2,755,179 | 7/1956 | Stalhed | 423/244 |
| 4,442,080 | 4/1984 | Donnelly et al. | 423/239 |
| 4,663,136 | 5/1987 | Furlong | 423/239 |

FOREIGN PATENT DOCUMENTS

| | | |
|---|---|---|
| 2155320 | 5/1973 | Fed. Rep. of Germany . |
| 2423874 | 12/1975 | Fed. Rep. of Germany . |
| 8203577 | 4/1984 | Netherlands . |
| 734111 | 7/1955 | United Kingdom . |

Primary Examiner—Gregory A. Heller
Attorney, Agent, or Firm—Kenyon & Kenyon

[57] ABSTRACT

A tower type reactor has two treatment stages through which a stream of granular bulk material passes downwardly to cool an upwardly flowing flue gas to the dew point temperature of the gas. In addition, a treatment agent is contacted with the flue gas so that pollutants such as sulfur dioxide are combined with the agent, for example, with an alkali or alkaline earth compound. The second stage of the reactor permits a flow of air to pass over the bulk material to cool the material and obtain waste heat which can be used for other purposes.

12 Claims, 3 Drawing Sheets

METHOD FOR PURIFYING FLUE GAS

This invention is related to a method and apparatus for purifying flue gas. More particularly, this invention relates to a method and apparatus for the dry purification of flue gas.

As is known, various types of methods have been used for the purification of flue gases from gaseous combustion products, such as sulfur dioxide ($SO_2$) and sulfur trioxide ($SO_3$). Usually, wet methods of purification using flue gas scrubbing have proved successful because of the favorable reaction conditions for pollutant binding in the dew point range. However, this requires reheating of the saturated gases before the gases enter a stack as well as processing of the wet reaction products. Especially in relatively small plants under 100 MW thermal, both of these added steps are relatively expensive and complex. Furthermore, in the flue gas scrubbing, a part of the heat content of the flue gases is consumed for the evaporation of the scrubbing water.

Accordingly, it is an object of the invention to be able to purify flue gases at reduced cost.

It is another object of the invention to purify flue gases of sulfur oxides at a reduced cost.

It is another object of the invention to improve the heat recovery in a purification process for the desulfurization of flue gases.

Briefly, the invention provides a method of purifying flue gas in which a flow of hot flue gas is passed in counter-current to a downwardly falling stream of a granular pourable cooling medium in a first stage in order to cool the flue gas to the dew point temperature while controlling the rate of flow of the stream of cooling medium in order to regulate the temperature of the flue gas. In addition, the cooled flue gas is contacted with at least one of a reactive alkali compound and a reactive alkaline earth compound in order to purify the gas. Thereafter, the heated cooling medium is cooled in a second stage and the cooled cooling medium recycled from the second stage to the first stage.

The invention also provides an apparatus for purifying flue gas which includes a tower type reactor having at least two vertically disposed treatment stages, means for passing a flow of flue gas upwardly through the upper one of the stages and means for cycling a stream of granular pourable cooling medium containing a treatment agent for purifying the flue gas sequentially through the upper stage and the lower stage of the reactor in order to place the flow of flue gas in counter-current with the pourable cooling medium. The apparatus also includes means for cooling the heated cooling medium in the lower stage and means for controlling the rate of flow of the pourable cooling medium through the stages of the reactor.

When using a tower type reactor with a pourable cooling medium, the flue gases can be cooled to the dew point without danger of clogging. Further, with the simultaneous addition of a treatment agent into the cooling medium, or with the selection of a treatment agent as the cooling medium, vaporous pollutants, particularly, sulfur dioxide and sulfur trioxide, can be bound simultaneously.

During operation, the hot flue gas is charged at the bottom of the upper stage and conducted upwardly in counter-current to a cold pourable cooling medium so that the flue gas becomes cooled. During this time, the flue gas passes through temperature ranges in which reactions with alkali or alkaline earth compounds which are present as treatment agents, e.g. calcium hydrate ($Ca(OH)_2$, milk of lime); sodium hydroxide (NaOH); calcium carbonate ($CACO_3$, limestone); sodium carbonate ($Na_2CO_3$); magnesium hydrate ($Mg(OH)_2$); magnesium carbonate ($mgCO_3$) and/or magnesium oxide (MgO)—are shifted in favor of a binding of the $SO_2$ and $SO_3$ to the alkali or alkaline earth metals. Thus, the purification of the flue gases is especially intensified.

The pourable cooling means is a bulk material which is charged continuously. For example, the bulk material may be a material which is inert to the flue gas. One inert material which is suitable also for high temperatures and is not attacked at the acid dew point may be ceramic balls. At temperatures below 105° C., rubber balls may be used. Other suitable bulk materials are metal balls, gravel, pebbles or the mentioned calcium carbonate with grain sizes 7 millimeters (mm). of 2 to 100 millimeters (mm).

In a part of the pourable cooling medium abrasion occurs. Losses of medium due to abrasion or surface erosion by pollutant binding are therefore made up by adding fresh medium from time-to-time. Advantageously, the cooling medium is cooled in the lower stage by an additional gas stream, likewise in counter-current, to a temperature below the dew point of the flue gas.

Due to the heat exchange between the charged cold cooling medium and the flue gas, a water vapor condensation occurs at the solid surface within the first stage which improves especially the reaction conditions for the $SO_2$ and $SO_3$ binding with calcium carbonate or calcium hydrate. To make sure that the temperature falls below the dew point in the first stage, the flow of the cold cooling medium must be controlled. Generally, the flow of the cooling medium is regulated as a function of the flue gas quantity, for example, in such a way that a cooling medium entrance temperature in the first stage is reached which is 10° to 20° C. below the flue gas exit temperature from this stage. Expediently, one can measure the temperature of the heated cooling medium at the exit from the first stage to regulate the rate of flow of the medium as a function of this temperature.

Combustion air can be used as the cooling gas in the second stage to advantage, so that the heat recovery from the flue gas can be utilized directly on the combustion air in a furnace. The entrance temperature of the air is, for example 20° to 60° C. below the dew point temperature of the flue gases, in order to be able to adjust a moisture of 1–2% at the cooling medium surface. Otherwise water or an aqueous solution of an alkali or alkaline earth compound may additionally be charged on the cooling medium before and/or after admission or readmission of the cooling medium to the first stage.

The rate of flow of the gases in the tower type reactor reaches values for example between 0.1 and 1 meters per second (m/sec), referred to the void cross-section, while the rates of flow of the bulk material are about 1/100 of the gas velocities. The pressure losses in the reactor and, hence the energy requirement, are determined by the bed heights, the height of bed depending also on the cross-section of the reactor. For a cross-section area of 1–1.5 square meters, for example, a bulk material height of 2 to 5 meters is sufficient. Areas of 30 $m^2$ to 50 $m^2$, on the other hand, require pile heights of 5 to 8 meters to obtain a uniform gas distribution in the bulk material. The pressure loss of the gas side will then be for example between 5 and 12 millibars.

An intermediate stage may also be provided by the tower type reactor between the first and second stages in which a partial stream of the flue gases purified in the first stage is heated to warm up the total stream of purified flue gases leaving the first stage. Naturally, it is also possible to utilize the combustion air heated in the second stage —for example via a circuit for indirect heat exchange —without an intermediate stage for warming up the flue gases leaving the first stage. The cooled and purified flue gas is, in this manner, again warmed by 20°-30° before entering a waste gas stack after further purification, for example filtering.

For combined purification of the flue gases from sulfur and nitrogen oxides, it has been found to be especially successful to take hot flue gases from a system for the separation of nitrogen oxides by means of ammonia ($NH_3$) and to conduct them uncooled into the first stage of the tower type reactor. This results in special advantages with regard to energy and apparatus since, for example, intermediate cooling of the denitrogenized flue gases before desulfurization can be omitted.

The energy balance for the entire combined purification process will be especially favorable if air warmed up in the second stage of the tower type reactor is used as a carrier material for the feeding of the nitrogen ($NH_3$) into the flue gas stream. A system for this combined method can be constructed in a compact and flow-dynamically favorable manner if the first stage of the tower type reactor is annularly surrounded by a means for the separation of nitrogen oxides which is traversed in a downward direction by the hot flue gases and is in flow communication with the first treatment stage through an annular flue gas passage.

The materials used for the tower type reactors are, for example materials which are non-rusting in the range of the dew point of the flue gases, and/or rubber or plastic coated carbon steels.

Figure 2:
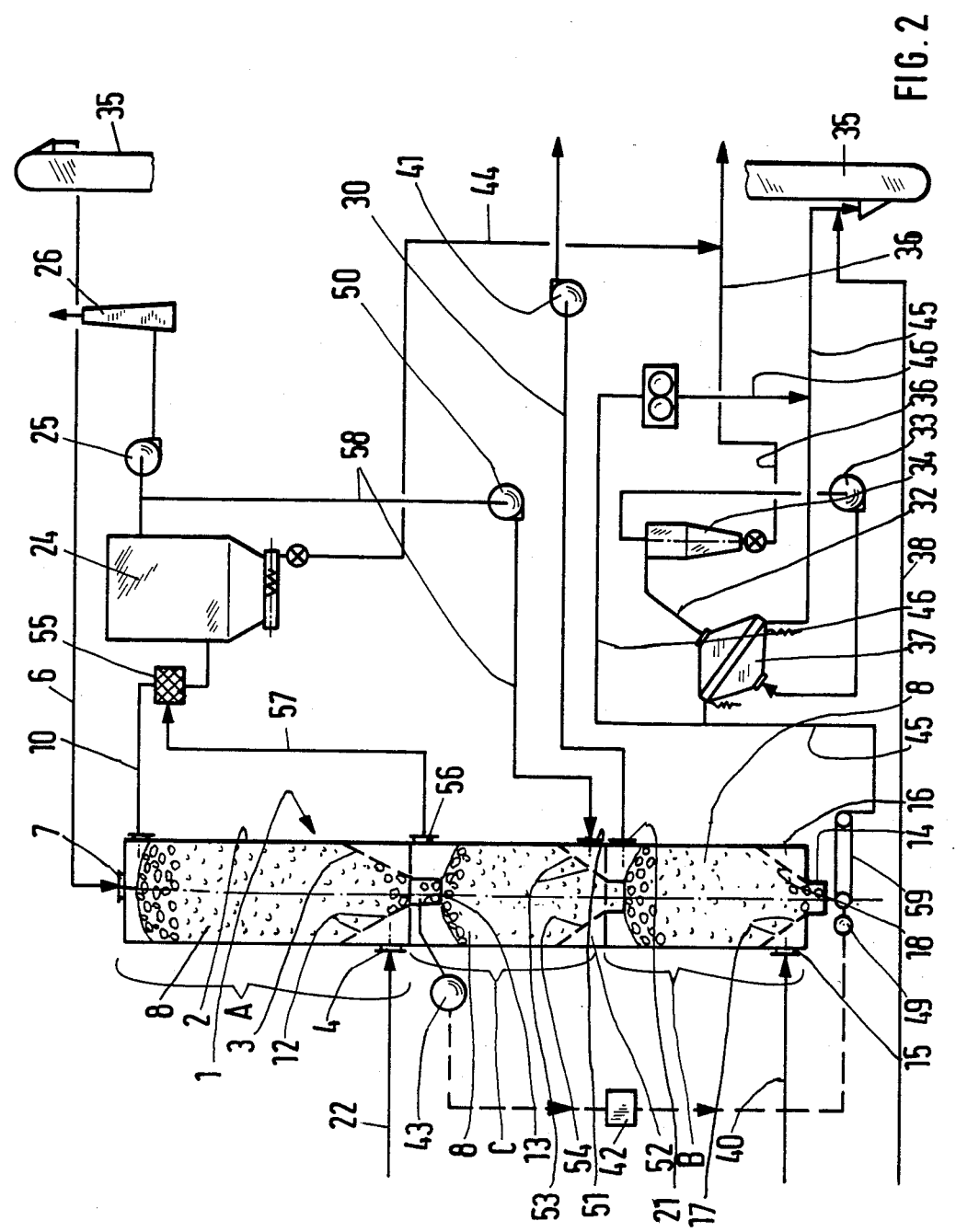
Figure 3:
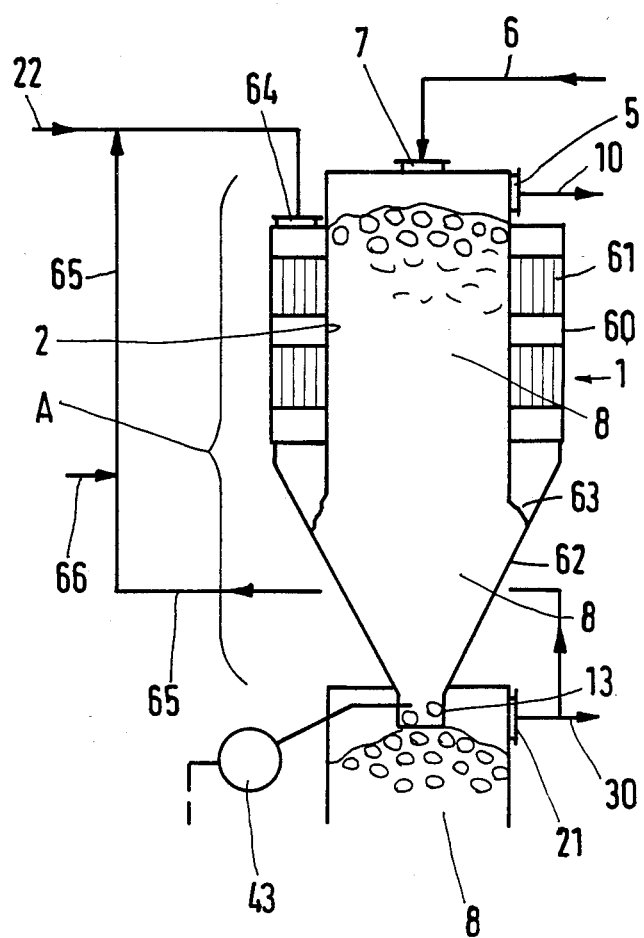

These and other objects and advantages of the the invention will become more apparent from the following detailed description taken in conjunction with the accompanying drawings wherein:

FIG. 1 schematically illustrates an apparatus for performing a method in accordance with the invention;

FIG. 2 schematically illustrates a modified apparatus for performing a purification method in accordance with the invention; and FIG. 3 illustrates a modified apparatus for the performance of a denitrogenization and of a desulfurization process.

Referring to FIG. 1, the apparatus for performing a dry purification of a flue gas includes a tower type reactor 1 having two vertically disposed treatment stages A, B which are accommodated in a common steel casing 2 of any cross section and which are separated from each other by a horizontal dividing wall 9. The upper treatment stage A narrows at the bottom in funnel fashion and has a funnel 3 "inserted" into the dividing wall 9.

The apparatus also includes a means for passing a flow of flue gas upwardly through the treatment stage A. As indicated, this means includes a gas inlet opening 4 in the bottom region of the treatment stage A, a feed line 22 for feeding flue gas through the inlet opening 4, a gas outlet opening 5 near the ceiling of the treatment stage A and a gas line 10 which leads from the gas outlet opening 5. In addition, the funnel 3 defines an annular chamber 11 with the casing 2 which communicates with the gas inlet 4 and which includes a plurality of openings 12 in order to pass the flue gas upwardly through the treatment stage A.

A means is also provided for cycling a stream of granular pourable cooling medium 8 sequentially through the treatment stages A, B in order to place the flow of flue gas in counter-current with the cooling medium for cooling of the flue gas. To this end, the means includes a supply line 6 for the pourable medium 8 which communicates with a supply opening 7 in the ceiling of the treatment stage A.

As indicated, the funnel 3 terminates in a tube 13 which leads through the dividing wall 9 into the lower stage B. The funnel 3 and tube 13 thus form flow conduction elements for the bulk material flow from the upper stage A into the lower stage B.

The basic arrangement of the treatment stage B is similar to that of the treatment stage A. As shown, the stage B has a gas inlet 15 at the bottom which leads into an annular space 16 limited internally by two funnels 18 which are provided with passage openings 17 through the gas. Each funnel 18 terminates in a tube 14 which contains a discharge means in the form of a bucket wheel sluice 20 to control the flow of pourable medium 8 therethrough. In addition, a gas outlet 21 is disposed at the ceiling of the treatment stage B above the bulk material 8 to exhaust gas from a gas-filled cavity above the bulk material 8.

A suitable line 40 communicates with the gas inlet 15 and has a blower 41 therein, for example for blowing air through the inlet 15 into the treatment stage B. Likewise, a line 30 extends from the outlet 21 for expelling hot air therefrom.

The means for cycling the bulk material 8 also includes a line 45 which extends from the bucket wheel sluices 20 to a sifter 37 which is constructed with a vibrated chute so that dust can be separated out of the bulk material 8 via a closed air circuit 32 which contains a fan 33 and a cyclone separator 34. The dust which accumulates within the separator 34 may consist of pulverized treatment agent which is charged with pollutants from the flue gases and of detritus of the granular bulk material 8. The abraded dust is then expelled via a line 36 to a suitable removal point. The bulk material 8 from the shifter 37 passes by means of a conveyor system 35, such as a band elevator, into the supply line 6 for the treatment stage A.

Losses of bulk material via the abraded dust can be replenished by an infeed line 38 which extends to the conveyor system 35. In addition, a feed line for treatment agent 39 may also connect with the infeed line 38 especially if the treatment agent is a liquid. For example, in the form of milk of lime. By way of example, the liquid treatment agent may be delivered in quantities of 140 cubic decimeters per hour and concentrations of 10%. When adding a liquid treatment agent, the water of the solution can serve to increase the moisture as the flue gas is cooled to below the dew point in the upper region of the bulk material bed in the treatment stage A.

If not all of the dust which consists in part of the treatment agent is to be removed from the system, a partial stream of the dust-laden bulk material 8 can be conducted past the shifter 37 over a by-pass line 46. It is thus possible to allow the pulverized treatment agent to circulate through the system several times and hence to use the agent more intensively.

The line 10 which extends from the flue gas outlet 5 of the treatment stage A passes in heat exchange relation through a heat exchanger 23 which is part of a closed circuit 27. As indicated, the closed circuit 27 includes a pump 28 for pumping a cooling medium such as water through the circuit in order to supply heat to the heat exchanger 23 for heating of the flue gas in the line 10. The circuit 27 also includes a heat exchanger 29 which is disposed in heat exchange relation with the exhaust line 30 from the treatment stage B so as to extract heat from the hot air exhausted from the treatment stage B. This heat is then transferred to the heat exchanger 23. Of note, the hot air in the line 30 may be used as combustion air for the furnace (not shown) of a central heating installation.

The exhaust line 10 from the treatment stage A also extends beyond the heat exchanger 23 to a filter 24, such as a cloth filter, for re-purification before being exhausted through a stack 26.

A regulator 42 is connected to the bucket wheel sluices 20 for controlling the sluices 20 and receives a measured value signal from a temperature sensor 43 which detects the temperature of the bulk material 8 at the lower end of the treatment stage A, i.e. within the tube 13. In this regard, the sensor 53 emits an actual value signal corresponding to the measured temperature to the regulator 42 and the signal is compared with a set value signal so that, in dependence upon the temperature of the bulk medium 8 in the tube 13, the sluices 20 are controlled so that the rate of flow of the bulk material 8 is controlled.

As shown, a separate infeed line 31 is connected to the exhaust line 10 from the treatment stage A in order to deliver a pulverized treatment agent thereto.

In use, for example, where the flue gas is exhausted from a coal-fired central heating installation, the hot flue gas is delivered into the gas inlet 4 of the treatment stage A. This hot flue gas then passes through the openings 12 in the funnel 3 and passes upwardly through the treatment stage A in counter-current to the stream of granular bulk material 8 in order to be cooled by the bulk material 8 to the dew point temperature.

The granular material 8 is delivered via the conveyor system 35 and feed line 6 through the inlet openings 7 so as to fill the treatment stage A as well as the treatment stage B. In this respect, the bulk material 8 traverses the treatment stages A, B by gravity in a continuous stream which is regulated through the bucket wheel sluices 20.

A temperature profile which is uniform over the cross section of the casing 2 in the bulk material 8 can be obtained or improved by the use of static mixing elements and/or drop-shaped displacement bodies (not shown) in the bulk material stream. Further, the bucket wheel sluices 20 may be replaced by other customary silo discharge devices such as conveyor belts or sliding bottoms.

The bulk material 8 may be porphyry with grain sizes between 5 and 50 millimeters. The treatment or desulfurization agent may be calcium hydrate ($Ca(OH)_2$) which is fed into the system as a powder. The through put quantity of the calcium hydrate may be twenty kilograms per hour with an average grain size of from 20 to 30 microns ($\mu m$) and a bulk weight of 0.5 tons per cubic meter. Air is also delivered via the line 40 for cooling of the granular bulk material 8 within the treatment stage B.

During treatment within the treatment stage A, the flue gas is contacted with the treatment agent and thereafter exhausted through the line 10. Upon entry into the treatment stage A, the temperature of the hot flue gas is at, for example 220 20 C. Upon leaving the treatment stage A, the flue gas is at approximately dew point temperature of about 45° C. The flue gas is then warmed in the heat exchanger 23 to about 70° C. and is conveyed via the fan 25 through the cloth filter 24 before being exhausted through the stack 26.

Since the line 31 is connected to the pure gas line 10 upstream of the filter 24, a practically neutral atmosphere may prevail in the filter 24 as there exists a very high excess of treatment agent relative to the small amount of sulfur dioxide remaining in the purified flue gas. The pulverized treatment agent is then separated as dust in the filter 24 and fed via the line 44 into the flow of bulk material 8 conducted in a closed circuit.

The recooling of the bulk material 8 in the treatment stage B occurs by means of the air stream which is delivered via the blower 41. The temperature of this air is at, for example 20° C. The air is then heated to about 200° C. in the treatment stage B during cooling of the bulk material 8. Hence, upon entering the exhaust line 30 and the heat exchanger 29, a part of the heat can be yielded to the water circulated through the closed circuit 27.

As mentioned above, the flow of the bulk material 8 through the reactor 1 must be adapted to the quantity of flue gas to be purified so as to assure cooling below the dew point. This control occurs via the regulator 42 as described above. Should an adjustment be required, the regulator 42 is able to adjust the drives (not shown) for the bucket wheel sluices 20.

Since the flue gas is cooled to the dew point, pollutants, mainly sulfur dioxide and sulfur trioxide, are transformed into the liquid phase in which they react intensively with the calcium of the treatment agent and are combined as sulfite. This binding occurs by the following reaction equation:

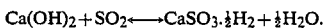

$$Ca(OH)_2 + SO_2 \longleftrightarrow CaSO_3 \cdot \tfrac{1}{2}H_2 + \tfrac{1}{2}H_2O.$$

Referring to FIG. 2, wherein like reference characters indicate like parts as above, limestone (calcium carbonate $CaCO_3$) can be used as the bulk material 8 since this is active not only as a cooling medium but also as a treatment agent. Accordingly, the lines 31, 39 for the addition of pulverized or liquid treatment agents are eliminated. In addition, there is no need for a by-pass line 46 for bypassing the sifter 37. Instead, a grinding unit 48 is provided so that a part of the granular bulk material particles, the surface of which consists of sulfur salts formed with pollutants, is crushed to create new reactive surfaces on the bulk material 8. Of note, through the softening due to a volume enlargement in connection with the friction in the flowing bulk material, a "self-activation" of the bulk material 8 may take place so that crushing of the particles of the bulk material are not required.

As indicated, a conveyor belt 59 replaces the bucket wheel sluices 20 of FIG. 1. This conveyor belt 59 is driven by a drive 49 which in turn is controlled via the regulator 42 in a manner as described above.

Since the treatment agent dust from the filter 24 need not be feed into the bulk material circuit, the line 44 for removing the dust from the filter 24 may open into the exhaust line 36 so that this dust is exhausted with other dust type waste materials from the system.

A means for heating a flow of purified gas from the upper stage A may include a third stage C in the reactor 1 between the upper and lower stages A,B. In addition, a line 58 is connected to the exhaust line 10 downstream of the filter 24 in order to pass a partial flow of the purified flue gas downstream of the filter 24 to the third stage C for heating therein. A second line 57 is also connected between the third stage C for conveying the heated partial flow into the exhaust line 10 via a mixer 55.

As indicated, the treatment stage C includes an inlet 51 for the stream of purified flue gas, an annular chamber 52 communicating with the inlet 51, formed in part by a funnel 54 having openings 53 and an outlet 56 communicating with the line 57. In addition, a fan 50 is disposed in the line 58.

During operation, a partial stream of the purified flue gas is conveyed by the fan 50 via the gas inlet 51 and chamber 52 upwardly through the medium 8 and then through the outlet 56 to the line 57. The relatively cool gas stream is thus heated up in the intermediate stage C and is thereafter admixed in the mixer 55 to the flue gas issuing from the treatment stage A at dew point temperature. Thus, as above, the flue gas temperature is increased.

The binding of the sulfur oxides occurs, when limestone is used as the bulk material or treatment agent, according to the reaction equations:

$$2\ CaCO_3 + 2\ SO_2 + H_2O \longleftrightarrow 2\ CaSO_3 \cdot \tfrac{1}{2} H_2O + 2\ CO_2$$

and, respectively, $$CaCO_3 + SO_3 \longleftrightarrow CaSO_4 + CO_2.$$

As mentioned, in the presence of oxygen, which is contained in particular in the air of stage B, the sulfite is oxidized to sulfate according to the equation:

$$2\ CaSO_3 + O_2 \longrightarrow 2\ CaSO_4.$$

Table 1 shows for the examples 1 and 2 quantitative data for flue gas purifications of two coal-fired small power plants or central heating installations according to the method.

TABLE 1

|  | Example 2 | Example 1 |
| --- | --- | --- |
| Flue Gas |  |  |
| Rate of flow, Nm³/h | 6,700 | 50,000 |
| SO₂ content, mg/Nm³ | 2,000 | 1,900 |
| Dust, mg/Nm³ | 3,700 | 1,000 |
| Entrance temperature to reactor, °C. | 220 | 180 |
| Dew point, which is also exit temperature from reactor, °C. | abt. 45° | abt. 45° |
| Temperature at stack, °C. | 70 | 80 |
| SO₂ content at stack, mg/Nm³ | 200 | 200 |
| Dust at stack | 10 | 10 |
| Recycled volume, Nm³/h | — | 18,500 |
| Entrance temperature to reactor (recycled volume), °C. | — | 80 |
| Exit temperature from the reactor (recycled vol.), °C. |  | 175 |
| Reactor |  |  |
| Bulk material | Porphyry | Limestone |
| Circulating flow, t/h | 11 | 78 |
| Treatment agent | Ca(OH)₂ | CaCO₃ |
| Charge/consumption (treatment agent), kg/h | 20 | 135 |
| Grain size of bulk material, mm | 5–50 | 2–50 |
| Entrance temperature, which is also exit temperature from reactor, °C. | 20 | 20 |
| Solid waste materials, including fly dust, kg/h | 55 | 190 |
| Fresh or combustion air |  |  |
| Rate of flow, Nm³/h | 6,500 | 50,000 |
| Entrance temperature to reactor, °C. | 20 | 20 |
| Exit temperature from reactor °C. | 178 | 120 |

TABLE 1-continued

|  | Example 2 | Example 1 |
| --- | --- | --- |
| Heat recovery, KW$_{th}$ | 372 | 1,800 |

Referring to FIG. 3, wherein like reference characters indicate like parts as above, the apparatus may be constructed for the performance of a combined purification, that is, a denitrogenization and desulfurization of the flue gases. To this end, a means is disposed about the upper treatment stage A in the flow of the flue gas upstream of the treatment stage A in order to separate nitrogen oxide from the flue gas. This means includes an annular chamber 60 having two rows of catalysts 61 for nitrogen oxide degradation by ammonia (NH₃) therein. As indicated, the rows of catalysts 61 are arranged one above the other for the passage of the hot flue gas and ammonia therethrough. In addition, an annular gap 63 is disposed at the lower end of the annular chamber 60 to communicate the chamber 60 with the interior of the treatment stage A.

The nitrogen oxide degradation in the chamber 60 occurs by one of the known processes, for example by an SCR process in which the nitrogen oxides are reacted to nitrogen and water in a temperature range of 300° to 400° C. by means of ammonia. In this case, the catalysts consist, for example, of titanium oxide (TiO₂). However, it is also possible to use other denitrogenization techniques such as that with molecular sieve or zeolite catalysts.

As shown in FIG. 3, a funnel 62 is contiguous to the bottom of the annular chamber 60 and terminates in a tube 13 which forms a transition to the lower stage B of the reactor 1. Further, the funnel 62 is filled, for the most part, with bulk material 8 which traverses the reactor 1 downwardly in the described manner.

The annular gap 63 between the lower end of the casing 2 and the funnel 62 is "closed" by a cone of downwardly flowing bulk material 8. This gap 63 permits the hot flue gas to flow into the stage A for upward flow in counter-current to the bulk material 8.

In contrast to the embodiment illustrated in FIG. 1, the supply line 22 for the hot flue gases to be purified terminates in a connecting pipe 64 at the top of the annular chamber 60. In addition, a feed line 65 extends from the exhaust line 30 from the treatment stage B to the supply line 22 in order to feed heated air into the supply line as a carrier for ammonia gas which is supplied via a feed line 66. As indicated, the line 65 is connected to the supply line 22 upstream from the connecting pipe 64 of the chamber 60. For a thorough mixing of the two gas streams, a mixer (not shown) similar to the mixer 55 in the exhaust line 10 illustrated in FIG. 2 may be provided downstream of the feed point at which the ammonia is supplied to the flue gas.

By way of example, the hot flue gas is supplied to the apparatus at a temperature in the line 22 of 356° C. prior to feeding in of the ammonia. With air the quality of which is about 1/10 of the flue gas quantity, as carrier air at a temperature of about 345° C., ammonia is fed into the supply line 22 so that the flue gases are cooled by about 1° C.

During passage through the annular chamber 60, a nitrous oxygen degradation occurs according to the formula:

$$6\ NO + 4NH_3 \longleftrightarrow 5\ N_2 + 6H_2O.$$

The desulfurization treatment corresponds—except for the throughput quantities—to the process described in connection with FIG. 1.

Due to the dynamics of the desulfurization reactor and the insensitivity and stability of the bulk material bed 8 to clogging and corrosion, the method of a combined flue gas purification is insensitive also to the reaction products ammonium sulfate or ammonium hydrogen sulfate which can form from $SO_2$ and from the residual $NH_3$.

In Table 2 are compiled quantitative data for an example of a combined flue gas purification in a system according to FIG. 3.

TABLE 2

| | |
|---|---|
| Flue Gas | |
| Flow, $Nm^3/h$ | 50,000 |
| $SO_2$ content, $mg/Nm^3$ | 1,900 |
| Dust, $mg/Nm^3$ | 3,700 |
| $NO_x$ $mg/Nm^3$ | 850 |
| Entrance temperature, °C. | 356 |
| Dew point, which is also exit temperature from reactor, °C. | 45 |
| Temperature at stack, °C. | 70 |
| $SO_2$ content at stack $mg/Nm^3$ | 200 |
| $NO_x$ content at stack $mg/Nm^3$ | 200 |
| Dust content at stack, $mg/Nm^3$ | 10 |
| Reactors | |
| $NO_x$ stage: | |
| Preheated carrier air for $NH_3$, $Nm^3/h$ | 5,000 |
| Temperature, °C. | 345 |
| Total gas, $Nm^3/h$ | 55,000 |
| Reactor entrance temperature, °C. | 345 |
| $NH_3$ charge, kg/h | 9.4 |
| Reactor exit temperature, °C. | 355 |
| $SO_2$ stage/heat exchanger: | |
| Bulk material | Porphyry |
| Circulating flow, t/h | 84.3 |
| Treatment agent | $Ca(OH)_2$ |
| Charge/consumption, kg/h | 150 |
| Grain size of bulk material, mm | 2–50 |
| Entrance temperature, which is also exit temperature, °C. | 20 |
| Solid waste materials, including fly dust, kg/h | 414 |
| Fresh or combustion air | |
| Rate of flow, $Nm^3/h$ | 55,000 |
| Entrance temperature to reactor, °C. | 20 |
| Exit temperature from reactor, °C. | 345 |
| Heat recovery, $kW_{th}$ | 5,100 |

The invention thus provides a technique of purifying flue gas in a dry manner and at a reduced cost as compared to previously known wet processes.

Further, in the invention provides a relatively simple system for not only removing sulfur oxides from a flue gas but also for removing nitrogen oxide from the flue gas.

I claim:

1. A method of purifying flue gas of at least sulfur oxides comprising the steps of passing a flow of hot flue gas in counter-current to a downwardly flowing stream of a granular pourable cooling medium containing at least one of a reactive alkali compound and a reactive alkali earth compound in a first stage to cool the flue gas to a dew point temperature thereof while bonding the sulfur oxides with the alkali compound at the dew point temperature;

controlling the rate of low of the stream of cooling medium in the first stage in response to the temperature of the cooling medium passing from the first stage to a second stage to regulate the temperature of the flue gas;

thereafter cooling the heated cooling medium in the second stage in heat exchange relation with a flow of air;

expelling the heated flow of air from the second stage for use as combustion air in a furnace; and re-cycling the cooled cooling medium from the second stage to the first stage while removing the bonded sulfur oxides from the cooling medium.

2. A method as set forth in claim 1 wherein said pourable cooling medium includes a calcium compound capable of reaction with the flue gas.

3. A method as set forth in claim 1 which further comprises the steps of heating a partial flow of the purified gas and re-cycling the heated gas into the flue gas leaving the first stage.

4. A method as set forth in claim 1 which further comprises the step of admitting water into the stream of pourable cooling medium to intensify the dew point conditions of the flue gas in the first stage.

5. A method as set forth in claim 1 which further comprises the step of admitting an aqueous solution of at least one of an alkali or alkaline earth compound into the stream of pourable cooling medium to intensify the dew point conditions of the flue gas in the first stage.

6. A method as set forth in claim 1 wherein the flue gas contains nitrogen oxide and which further comprises the step of adding ammonia gas to the flow of flue gas upstream of the first stage to remove nitrogen oxide from the flue gas.

7. A method as set forth in claim 6 which further comprises the steps of directing a partial flow of the heated air in the second stage into the flow of flue gas upstream of the first stage and adding the ammonia gas to the heated air whereby the heated air acts as a carrier for delivery of the ammonia gas into the flue gas.

8. A method as set forth in claim 1 wherein the flue gas contains sulfur dioxide and sulfur trioxide and the pourable medium includes a treatment agent capable of removing sulfur dioxide and sulfur trioxide from the flue gas.

9. A method as set forth in claim 1 wherein the dew point temperature is about 45° C.

10. A method of removing sulfur oxides from a flue gas comprising the steps of passing a flow of hot flue gas containing sulfur oxides in counter-current to a downwardly flowing stream of a granular pourable cooling medium containing at least one of a reactive alkali compound and a reactive alkali earth compound in a first stage to cool the flue gas to the dew point temperature thereof while bonding the sulfur oxides with the reactive compound;

controlling the rate of flow of the stream of granular cooling medium in response to the temperature of the cooling medium passing from the first stage to a second stage to regulate the temperature of the flue gas;

thereafter cooling the heated cooling medium in the second stage in heat exchange relation with a flow of air; and removing bonded sulfur oxides from the cooled cooling medium and re-cycling the cooled cooling medium from the second stage to the first stage.

11. A method as set forth in claim 10 wherein the flue gas contains nitrogen oxide and which further comprises the steps of adding ammonia gas to the flow of flue gas upstream of the first stage to remove nitrogen oxide from the flue gas.

12. A method as set forth in claim 10 wherein the pourable medium includes a treatment agent capable of removing sulfur dioxide and sulfur trioxide from the flue gas.

* * * * *

UNITED STATES PATENT AND TRADEMARK OFFICE
CERTIFICATE OF CORRECTION

PATENT NO. : 4,780,290

DATED : Oct. 25, 1988

INVENTOR(S) : Friedrich R. Curtius

It is certified that error appears in the above-identified patent and that said Letters Patent is hereby corrected as shown below:

Column 5, line 68 change "22020" to $-220°-$

Column 9, line 64 change "low" to -flow-

Signed and Sealed this

Fourth Day of July, 1989

Attest:

DONALD J. QUIGG

*Attesting Officer*   *Commissioner of Patents and Trademarks*